Aug. 23, 1960     H. LANGSTROTH     2,950,421
PRESSURE SENSING DEVICE
Filed Nov. 9, 1956
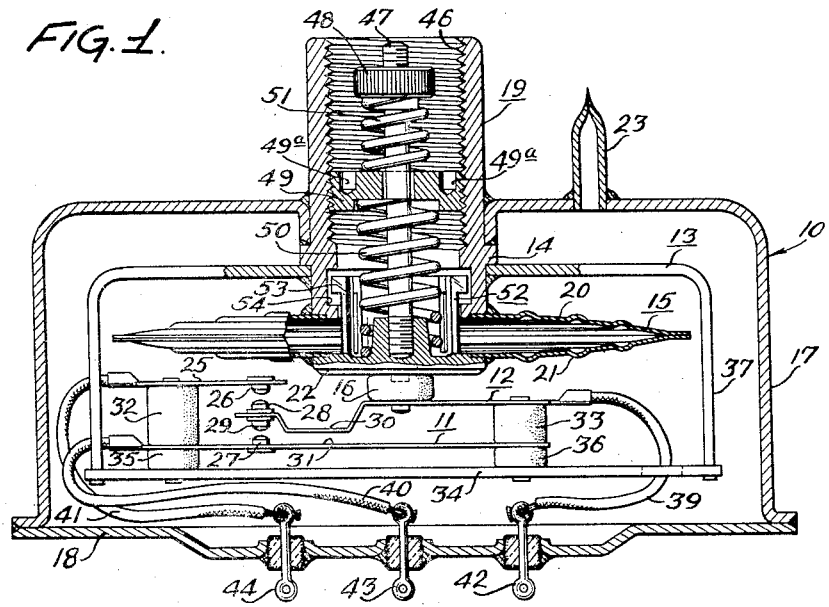
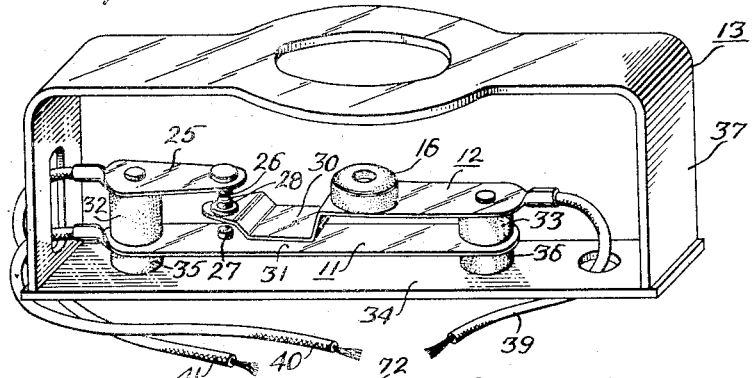
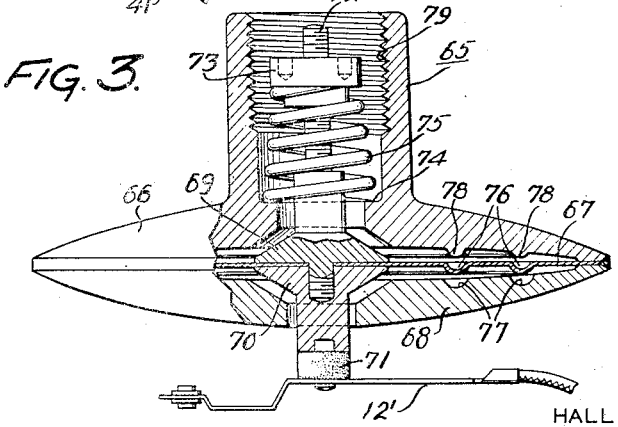
INVENTOR:
HALL LANGSTROTH
ATTYS.

United States Patent Office 2,950,421
Patented Aug. 23, 1960

2,950,421

PRESSURE SENSING DEVICE

Hall Langstroth, 1454 Alegriano Ave., Coral Gables, Fla.

Filed Nov. 9, 1956, Ser. No. 621,333

1 Claim. (Cl. 317—99)

This invention relates to a pressure sensing device useful for the measurement of pressures to a high degree of accuracy. More specifically, this invention relates to a pressure sensing device which uses electrical conductors in combination with a flexible pressure sensing element to measure pressures to a high degree of accuracy.

The present invention provides a highly reliable yet simple pressure sensing device which is capable of a range of accuracy which is quite satisfactory for many applications where much more complex equipment has been used heretofore. Nevertheless, the device of the present invention consists of relatively few parts and is easily and inexpensively assembled.

The present invention has the virtue of being a low friction device since it can be constructed without surfaces which rub together so that there is no need for bearings to be used. Moreover, the range of movement required for a relatively wide range of reading is extremely small. In preferred embodiments of the invention, the range of readings is relatively easily changed by substitution of externally located easily accessible spring members. Furthermore, adjustment is easily accomplished by one having very little skill and experience.

The device in terms of broadest inclusion has a pair of conductors, at least one of which is movable relative to the other and which cooperate together by movement to provide an electrical effect. A common support is provided for the conductors including a vacuum tight envelope having rigid walls. A flexible wall is also provided in said envelope and means is provided for coupling together the flexible walls and the movable conductor, such that changes in pressure outside the envelope produce corresponding changes in the position of the movable member. In the usual situation, the conductors are enclosed within the envelope.

One embodiment of the present invention provides a pair of conductors each of which has a plate of a capacitor positioned relative to the other capacitor plate such that relative movement between the conductors produces a change in capacitance therebetween. Therefore, because the movement of the capacitor plates is attributable to changes in pressure, the pressure recorded by the device is a function of this capacitance.

In conjunction with or in place of capacitor plates, the device may have switch contacts, in which event the device acts as a switch which is either open or closed, and which can monitor the capacitive position, depending on the position of the contacts at a particular pressure level. It is possible to provide two sets of contacts so that a range of pressures is included between the pressures at which the respective sets of contacts are closed. It is a common useful expedient to provide both a capacitor for measurement of pressures and switches for determination of the range of pressures to be measured.

In a particular version of the present invention, the action of the pressure sensing device will depend upon the relative pressures inside and outside the envelope, the flexibility of the flexible portion of the envelope, the area of the flexible portion of the envelope, the resistance offered by the movable conductor, and the resilence of any spring members which may be employed to add or detract from the inherent flexibility of the diaphragm member. As a practical matter, external spring members for controlling these effects are quite desirable and enable the selection of a variety of ranges of pressure to be measured.

For a better understanding of the present invention, reference is made to the drawings, in which Fig. 1 is a sectional elevational view of a preferred embodiment of the pressure sensing device of the present invention;

Fig. 2 is a perspective view of the conductor assembly of the present invention; and Fig. 3 is a modified form of the pressure sensing device which may be substituted for that shown in Fig. 1.

Referring first to Figs. 1 and 2, there is illustrated one embodiment of the present invention. As illustrated, within a vacuum envelope generally designated 10 are a pair of conductors 11 and 12, conductor 12 being movably mounted and the two of them being arranged so that their relative movement produces an electrical effect. The conductors are supported on support member 13, which, in turn, is supported on a re-entrant portion 14 of the envelope. Flexible walls, generally designated 15 are provided to complete the envelope at the internal end of the re-entrant portion 14 and its flexible wall is coupled to the movable conductor by a member 16 so that changes in pressure outside of the envelope will produce a change in position of the movable member.

The envelope of the structure of Fig. 1 consists of a generally cup-like member 17 which is brazed or otherwise sealed vacuum tight to generally planar member 18. Tubular member 19 is arranged to partially penetrate the bottom of cup 17 or the top wall of the device as it is illustrated so as to extend inwardly into the enclosure sufficiently far to provide re-entrant portion 14. Tubular member 19 is brazed or otherwise fixed to vacuum tight tube cup member 17. The flexible wall 15 completing the vacuum wall in this instance is a flexible walled structure or bellows of lenticular form which is produced by a pair of sheet metal concave members 20 and 21 which are secured together at their outer edge by welding, brazing or other means for producing a vacuum tight joint. In the version illustrated, both members 20 and 21 are annular and brazed in vacuum tight seals at their edges, member 20 being brazed to the tubular member 19 and member 21 being brazed to a sleeve 22 grooved to provide a base for a spring, as will be hereafter described. A tubulation 23, preferably of copper, extends into the envelope 10 to which it is brazed in a vacuum tight seal in order to provide an exhaust port for evacuating the envelope 10. If a copper tubulation is employed, it may be sealed vacuum tight after evacuation is completed by pinching together its side walls using a plier-like device having opposed cylindrical surfaces for jaws.

It will be appreciated that instead of evacuating to one degree or another the envelope 10 may be filled with gas under pressure for certain applications.

As may be seen in both Figs. 1 and 2, in this particular embodiment, there is a third conductor 25 supported relative to and cooperating with the movable conductor 12. Specifically, in this embodiment, the fixed conductors 25 and 11 support closed contacts 26 and 27, respectively. Conductor 12 supports contacts 28 and 29 on opposite surfaces arranged so that contact 28 is opposed to and designed to touch contact 26 in one position and so that contact 29 is opposed to and designed to touch contact 27 in another position of member 12. The conductors 11 and 25 are strips, strip 11 being stationary by virtue of its mounting and strip 25 being relatively rigid and stationary despite its cantilever arrangement. Conductor 12 is also a strip which is supported in cantilever fashion and which, by its natural resilience, is sort of a spring member. Its attachment to insulator 16 makes strip 12 a lever having a fulcrum at one end and an output at the other end on which the contacts 28 and 29 are mounted. Also adjacent this end is an area 30 which is depressed from the general plane of the strip toward a corresponding area on strip 11. These areas effectively provide plates of a capacitor, the spacing of which is varied by movement of conductor 12.

In a preferred embodiment of the invention, such as that shown in Fig. 1, the conductors 11, 12 and 25 are insulated from one another and in the structure of Figs. 1 and 2, the insulating material provides support means for the conductors. For example, conductor 25 and conductor 11 are each fixed to block 32 which serves to space them as well as to insulate them. Similarly, block 33 spaces and insulates strips 11 and 12. A generally planar mounting deck 34 supports insulating blocks 35, 36 and insulates conductor 11 from the envelope and support structure. In other instances, strip 11 might be at the same potential as the envelope or one of the other strips might be at the envelope potential. Support is completed by yoke member 37 which supports planar support deck 34 at its opposite ends and which, has an intermediate annular portion which, in turn, is supported on tubular member 19 in such position that the insulator 16 fills the gap between member 22 and conductor 12. Member 16 is then fixed to both these members in order to supply conductor 12 with motive power from the flexible walls 15.

The conductors 12, 11 and 25 are conductively connected to conductors 39, 40 and 41 which are, in turn, connected to terminals 42, 43, and 44, respectively. Leads 39 and 40 are preferably removed from opposite ends of the conductors in order to minimize interelectrode capacitance. The terminals 42, 43 and 44 are sealed to ceramic bushings which, in turn, are sealed to the vacuum envelope in order to preserve the vacuum tightness of the envelope. External leads may be connected to these terminals, as will be described hereafter.

In the structure shown in Fig. 1, the tubular member 19 having its internal surface 46 threaded and member 22 is provided with a rigid member 47 which extends outwardly in the general direction of the re-entrant opening and which is preferably axially aligned and provided with threads at least at its outer end in order to accommodate nut 48, whose inner surface engages the threads on member 47. Movable shoulder 49 is merely an annular member which has its outer surface threaded to engage the threads on surface 46 and which is provided with holes 49a to accommodate a sort of spanner wrench for adjustment of the shoulder. Surrounding the rigid member 47 is spring 50 which extends between an annular groove in member 22 and a similar groove in shoulder 49, said groove being for the purpose of holding the spring in place. Similarly, a spring 51 extends between shoulder 49 and nut 48. The spring 50 between shoulder 49 and member 22, which is effectively part of the flexible walls 15, has the effect of expanding the flexible walled structure by urging member 22 inwardly.

It will be observed that the spring pressure of spring 50 may be increased or decreased by moving shoulder 49. This will, of course, be accompanied by the decrease in spring pressure of spring 51, but this pressure can be adjusted by adjustment of nut 48. It is possible to remove these springs and substitute others and this may be done in order to change the range of operation of the device. If, for example, the pressure by spring 51 is greater than the pressure by spring 50, the flexible wall will be urged outwardly pulling conductor 12 with it, perhaps to the point where contact 28 contacts contact 26. Thereafter, as pressure is increased to the point where there is near equilibrium, the contact 28 will tend to move away from contact 26 and contact 29 will be moved closer to contact 27. Similarly, by this action, plate 30 will be moved closer to plate 31. The action of this device is, of course, dependent upon a number of things: the pre-loading of the springs for adjusting the set point, the area of the flexible walls, the "spring rate" of the flexible walls and the "spring rates" of the springs 50 and 51, as well as the "spring rate" of member 12, and the vacuum reference applied to the effective area of the bellows referred to as "flexible walls." The selection of the springs 50 and 51 gives some range of variety in operation to the device.

Fingers 52 are provided with stops 53 which fit within an annular channel 54 in tubular member 19 in order to limit the travel of member 22 and hence, conductor 12. Because of the resiliency of the spring fingers, it is possible to depress them inwardly when assemblying the device. These fingers are effective in preventing overload of the device and, in addition, may, by their nature, aid in preservation of alignment. Alignment is also preserved by the use of the concentric pattern of embossing on the members 20 and 21, which increases their flexibility in the direction of movement.

In operation, the device may be used for a variety of pressure sensing applications involving either liquids or gases. Whatever the application, it is common to attach a hose or line connection to the internally-threaded surface 46 so that the pressure to be sensed is not applied to the entire external surface of the envelope, although it can be equally well thus applied.

Terminals 42, 43 and 44, in the use of the device, will, of course, be connected to external circuitry. They can be connected in a variety of ways for on-off range limit indication as well as capacitive readings between terminals 42 and 43 for capacitively detected pressure sensing.

In a modification of the structure shown in Figs. 1 and 2, the conductors may be modified from the form illustrated. One purpose of modification is to make the movable conductor a spider-like spring arrangement. Such a spider might have three or more legs, preferably spaced at essential equal angles, each fixed at its outer edges to a supporting structure corresponding to insulator 33. One of these legs may serve to support the contacts 28 and 29 and the condenser plate 30, or these elements may be supported on different parts of the spider. Still another construction would employ a shorter leg supported only at its center and extending radially outwardly in a cantilever supported structure. Any construction employing such a spider would have the advantage of aiding in the centering and maintenance of axial movement of the flexible wall and associated moving parts. Moreover, it would have a substantial spring effect which, however, would not be adjustable in a way that springs 50 and 51 are adjustable because of their external location. For the sake of symmetry, the other conductors 11 and 25 could also be made spider-like. With a spider-like construction, the envelope would have to be cylindrical in form, whereas, with the structure illustrated, the envelope could be cylindrical or could be of the general form of a rectangular solid.

Referring to Fig. 3 there is illustrated a modified form of the flexible wall structure and its associated parts, which is particularly useful in very high pressure applications. Corresponding to the tubular member 19 is a tubular member 65 which includes as an integral part the bell-like flange 66. The tubular portion 65 of the structure is supported in a similar position to the structure 19 in a similar type of vacuum envelope. The vacuum wall is completed by the flexible diaphragm member 67 which stretches across the outer edges of bell member 66 and is affixed thereto by brazing. Affixed in the same brazing process may be a concave member 68 similar in form to member 66 and in opposed relationship thereto. The members 66 and 68 form a lenticular cavity in which diaphragm 67 is free to move. Affixed to the diaphragm 67 are members 69 and 70 which extend in opposite directions and which form a vacuum-tight joint with the diaphragm. Member 70 extends through an axial opening in member 68 and is terminated in an insulator 71 which is connected to the movable conductor 12'. The member 69 is made to extend outwardly and is terminated in an axially-extending stud member 72 arranged on the axis of tubular member 65. Stud member 72 is threaded to accommodate nut 73. Opposed to the inner surface of nut 73 is a shoulder 74 and a spring 75 is arranged to extend between these opposed surfaces as shown. This spring will tend to urge the diaphragm outwardly in order to enlarge the volume of the envelope. The inner surface 79 of the tubular member 65 is threaded in order to engage a coupling member to a hose or other supply line which supplies fluid at the pressure which is to be sensed.

It will be apparent to those skilled in the art that the lenticular enclosure formed by members 66 and 68 provide protection against overloading the diaphragm 67. Thus, the Fig. 3 embodiment is particularly useful at high pressure levels where the possibility of overloading is great. The annular grooves 76 provide a stiffening feature except in the proper direction of movement of the diaphragm, in which direction, they permit ready flexing. In this preferred form of the invention, the grooves are impressed in a plain diaphragm by materially overloading the diaphragm during testing so that fluid pressure causes the depressions to be formed in the diaphragm which is forced into grooves 77 in member 68, thereby stretching the material and eliminating "oil can effect" or the tendency to snap back and forth present in a plain disc. Protrusions 78 then may or may not be provided but, in any event, it is desirable to provide a smooth surface against which the diaphragm may be pressed in either direction in order to protect the diaphragm under extreme pressure conditions. Similarly, the members 69 and 70 are shaped to conform to the surfaces against which they will lie in maximum and minimum positions of the diaphragm.

Various modifications in the form of the invention have been described and it will be apparent to those skilled in the art that still other modifications are possible. All such modifications within the scope of the claim are intended to be within the scope and spirit of the present invention.

I claim:

A pressure sensing device comprised of an outer hermetically sealed closure, in which is contained a hermetically sealed flexible pressure sensing bellows, the inside surfaces of said flexible bellows are open to other pressures through a tubular sleeve means, with attaching means to the outer closure, the internal end of said sleeves has mounting means to fasten the fixed end of said sensing bellows, spring means within said tubular sleeve can be adjusted to position the movable end of said bellows, said spring means control the amount of travel of said bellows in relation to the pressure applied, a first conductor plate attached by insulation means to the central movable end of said bellows moves in relation to a second fixed conductor plate supported by insulated bracket means, a change in the position of said first conductor provides means to cause a change in the capacitance effect in an electrical circuit, to indicate by the capacitance change, the amount of pressure change, a third conductor plate supported by common bracket means as said second conductor plate has attached electrical contact means, said first movable conductor plate is between said second and third conductor plates, said conductor plates have electrical contact means which open or close at preselected pressure points, the conductor plates are each connected to insulated leads which pass through the outer hermetically sealed closure.

References Cited in the file of this patent

UNITED STATES PATENTS

| | | |
|---|---|---|
| 1,684,530 | Bast | Sept. 18, 1928 |
| 1,736,797 | Mortensen | Nov. 26, 1929 |
| 1,754,436 | Remington | Apr. 15, 1930 |
| 2,092,955 | Chamberlain | Sept. 14, 1937 |
| 2,381,835 | Moorhead | Aug. 7, 1945 |
| 2,442,108 | Zeller | May 25, 1948 |
| 2,510,460 | Brooke | June 6, 1950 |
| 2,607,228 | Coxen | Aug. 19, 1952 |
| 2,677,963 | Mullins, et al. | May 11, 1954 |
| 2,714,703 | Ruderfer | Aug. 2, 1955 |
| 2,740,927 | Jennings et al. | Apr. 3, 1956 |
| 2,785,570 | Mounteer | Mar. 19, 1957 |

FOREIGN PATENTS

| | | |
|---|---|---|
| 405,495 | Italy | Aug. 16, 1943 |